(12) United States Patent
Luescher et al.

(10) Patent No.: US 10,828,742 B2
(45) Date of Patent: Nov. 10, 2020

(54) QUICK TENSIONING DEVICE FOR A PORTABLE MACHINE TOOL, IN PARTICULAR FOR AN ANGLE GRINDING MACHINE

(71) Applicant: Robert Bosch GmbH, Stuttgart (DE)

(72) Inventors: Bruno Luescher, Vordemwald (CH); Andreas Zurbruegg, Lohn-Ammansegg (CH); Bruno Sinzig, Oberbipp (CH); Marcus Schuller, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/324,470

(22) PCT Filed: Aug. 18, 2017

(86) PCT No.: PCT/EP2017/070920
§ 371 (c)(1),
(2) Date: Feb. 8, 2019

(87) PCT Pub. No.: WO2018/036920
PCT Pub. Date: Mar. 1, 2018

(65) Prior Publication Data
US 2019/0193235 A1   Jun. 27, 2019

(30) Foreign Application Priority Data

Aug. 22, 2016  (DE) .......................... 10 2016 215 691
Aug. 22, 2016  (DE) .......................... 10 2016 215 702
(Continued)

(51) Int. Cl.
*B24B 23/02*  (2006.01)
*B27B 5/32*   (2006.01)
(Continued)

(52) U.S. Cl.
CPC ............ *B24B 23/022* (2013.01); *B23B 31/10* (2013.01); *B24B 45/006* (2013.01); *B27B 5/32* (2013.01); *B24B 23/028* (2013.01); *Y10T 279/33* (2015.01)

(58) Field of Classification Search
CPC ....... B24B 23/022; B24B 45/006; B27B 5/32; B23B 31/10
See application file for complete search history.

(56) References Cited

U.S. PATENT DOCUMENTS 6,340,022 B1 *  1/2002  Schroer .................... B27B 5/32
                                                      125/12
6,796,888 B2 *  9/2004  Jasch .................... B23B 31/008
                                                      451/342
(Continued)

FOREIGN PATENT DOCUMENTS

DE   10 2004 020 982 A1   11/2005
DE   10 2012 004 458 A1    9/2013
(Continued)

OTHER PUBLICATIONS

International Search Report corresponding to PCT Application No. PCT/EP2017/070920, dated Nov. 27, 2017 (German and English language document) (7 pages).

*Primary Examiner* — Eric A. Gates
(74) *Attorney, Agent, or Firm* — Maginot, Moore & Beck LLP

(57) ABSTRACT

A quick tensioning device for a portable machine tool, in particular for an angle grinding machine, includes at least one output shaft which can be rotated, at least one clamping unit that is at least partly arranged in the output shaft and has at least one clamping element, which is movably mounted at least about and/or along a movement axis of the clamping unit, for fixing an insert tool unit to the output shaft without tools, and at least one torque transmission unit for transmit-
(Continued)

ting a torque to the insert tool unit when the insert tool unit is arranged on the output shaft, said torque transmission unit having at least one torque transmission element which is formed separately from the output shaft. The quick tensioning device includes at least one securing unit at least for securing the torque transmission element to the output shaft in a rotationally fixed manner.

18 Claims, 12 Drawing Sheets

(30) Foreign Application Priority Data

| Jan. 31, 2017 | (DE) | 10 2017 201 501 |
|---|---|---|
| Jan. 31, 2017 | (DE) | 10 2017 201 509 |
| Aug. 7, 2017 | (DE) | 10 2017 213 668 |
| Aug. 7, 2017 | (DE) | 10 2017 213 669 |
| Aug. 7, 2017 | (DE) | 20 2017 104 815 U |
| Aug. 7, 2017 | (DE) | 20 2017 104 816 U |
| Aug. 11, 2017 | (DE) | 10 2017 214 119 |

(51) Int. Cl.
*B24B 45/00* (2006.01)
*B23B 31/10* (2006.01)

(56) References Cited

U.S. PATENT DOCUMENTS

| 6,814,655 | B2* | 11/2004 | Hofmann | B24B 23/02 |
| | | | | 451/342 |
| 7,497,766 | B2* | 3/2009 | Kraenzler | B21K 1/12 |
| | | | | 451/359 |
| 7,739,932 | B2* | 6/2010 | Kraenzler | B24B 23/022 |
| | | | | 464/100 |
| 8,187,058 | B2* | 5/2012 | Blickle | B24B 45/006 |
| | | | | 451/342 |
| 9,486,887 | B2* | 11/2016 | Fankhauser | B23D 51/10 |
| 9,694,472 | B2* | 7/2017 | Luescher | B24B 23/04 |
| 10,052,695 | B2* | 8/2018 | Klabunde | B24B 45/006 |
| 10,065,248 | B2* | 9/2018 | Klabunde | B27B 5/30 |
| 10,471,518 | B2* | 11/2019 | Klabunde | B24B 45/006 |
| 2014/0182873 | A1* | 7/2014 | Fankhauser | B24B 45/00 |
| | | | | 173/213 |

FOREIGN PATENT DOCUMENTS

| DE | 10 2012 007 926 A1 | 10/2013 |
| DE | 20 2013 006 901 U1 | 12/2014 |
| WO | 03/103897 A2 | 12/2003 |
| WO | 2013/131676 A2 | 9/2013 |
| WO | 2015/014468 A1 | 2/2015 |
| WO | 2015/014469 A1 | 2/2015 |

* cited by examiner

QUICK TENSIONING DEVICE FOR A PORTABLE MACHINE TOOL, IN PARTICULAR FOR AN ANGLE GRINDING MACHINE

This application is a 35 U.S.C. § 371 National Stage Application of PCT/EP2017/070920, filed on Aug. 22, 2017, which claims the benefit of priority to Serial Nos. DE 10 2016 215 691.8, filed on Aug. 22, 2016; DE 10 2016 215 702.7, filed on Aug. 22, 2016; DE 10 2017 201 509.8, filed on Jan. 31, 2017; DE 10 2017 201 501.2, filed on Jan. 31, 2017; DE 20 2017 104 815.2, filed on Aug. 7, 2017; DE 10 2017 213 668.5, filed on Aug. 7, 2017; DE 10 2017 213 669.3, filed on Aug. 7, 2017; DE 20 2017 104 816.0, filed on Aug. 7, 2017; DE 10 2017 214 119.0, filed on Aug. 11, 2017, all filed in Germany, the disclosures of which are incorporated herein by reference in their entirety.

BACKGROUND

There are already known quick-change clamping devices for portable power tools, which comprise an output shaft, a clamping unit that is arranged, at least partly, in the output shaft and that has at least one clamping element mounted so as to be movable at least about and/or along a movement axis of the clamping unit, for the purpose of fixing an insert tool unit to the output shaft without the use of tools, and a torque transmission unit, which has at least one torque transmission element, for transmitting a torque to an insert tool unit when the insert tool unit has been arranged on the output shaft.

SUMMARY

The disclosure is based on a quick-change clamping device for a portable power tool, in particular for a power angle grinder, having at least one output shaft that, in particular, can be driven in rotation, having at least one clamping unit that is arranged, at least partly, in the output shaft and that has at least one clamping element mounted so as to be movable at least about and/or along a movement axis of the clamping unit, for the purpose of fixing an insert tool unit to the output shaft without the use of tools, and having at least one torque transmission unit, which has at least one torque transmission element, in particular realized separately from the output shaft, for transmitting a torque to the insert tool unit when the insert tool unit has been arranged on the output shaft.

It is proposed that the quick-change clamping device comprise at least one fastening unit, at least for fastening the torque transmission element to the output shaft, in particular in a rotationally fixed manner. When the insert tool unit has been arranged on the clamping unit and/or on the output shaft, the torque transmission element preferably engages in a receiving cutout of the insert tool unit and, for the purpose of transmitting torque, bears against at least one edge that delimits the receiving cutout. When the insert tool unit has been arranged on the output shaft, transmission of torque between the output shaft and the insert tool unit arranged on the clamping unit and/or on the output shaft is preferably effected, in a manner already known to persons skilled in the art, by means of a positive connection between the torque transmission element and the insert tool unit. The torque transmission element is preferably arranged in a rotationally fixed manner on the output shaft. The torque transmission element can be driven in rotation, together with the output shaft, about a rotation axis of the output shaft. Preferably, the rotation axis of the output shaft runs at least substantially perpendicularly in relation to the movement axis of the clamping unit. Alternatively, however, it is also conceivable for the rotation axis of the output shaft to run at least substantially parallel to the movement axis of the clamping unit. The expression "substantially perpendicularly" is intended here to define, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. "Substantially parallel" is to be understood here to mean, in particular, an alignment of a direction relative to a reference direction, in particular in one plane, the direction deviating with respect to the reference direction by, in particular, less than 8°, advantageously less than 5°, and particularly advantageously less than 2°. "Movably mounted" is to be understood to mean, in particular, a mounting of an element and/or of a unit, the element and/or the unit having a movement capability, in particular dissociated from an elastic deformation of the element and/or of the unit, along a movement axis, of more than 5 mm, preferably of more than 10 mm, and particularly preferably of more then 50 mm, and/or about a movement axis, along an angular range of more than 1°, preferably of more than 5°, and particularly preferably of more than 15°.

Preferably, the clamping element is arranged, at least partly, in the output shaft. Preferably, the output shaft surrounds the clamping element, at least partly, in particular completely, along a circumferential direction of the output shaft that runs around a rotation axis of the output shaft. The circumferential direction of the output shaft preferably runs in a plane extending at least substantially perpendicularly in relation to the rotation axis of the output shaft. Preferably, the clamping element is connected to the output shaft in a rotationally fixed manner. Preferably, the clamping element is mounted so as to be movable, in particular rotatable, together with the output shaft, about the rotation axis. The rotation axis of the output shaft preferably runs at least substantially parallel to, in particular coaxially with, at least one movement axis of the clamping unit. Preferably, the clamping element is mounted so as to be pivotable about a pivot axis of the clamping element. Preferably, the pivot axis of the clamping element runs transversely, in particular at least substantially perpendicularly, in relation to the rotation axis of the output shaft Preferably, the pivot axis of the clamping element runs at least substantially perpendicularly in relation to a clamping axis of the clamping unit. The pivot axis of the clamping element preferably forms at least one movement axis of the clamping unit. The pivot axis of the clamping element preferably runs at least substantially perpendicularly in relation to a clamping axis of the clamping unit. A "clamping axis" is to be understood here to mean, in particular, an axis of the clamping unit along which an axial securing force of the clamping unit can be exerted upon the insert tool unit for the purpose of fixing the insert tool unit to the output shaft, and/or along which a transmission element of the clamping unit is movably mounted for the purpose of moving the clamping element. The clamping axis preferably forms at least one further movement axis of the clamping unit. Preferably, the clamping element is realized as a clamping jaw. Preferably, the clamping element is designed to secure the insert tool unit axially to the output shaft. The clamping element, at least in the clamping position, preferably engages, at least partly, in the insert tool unit, in particular in a fixing cutout of the insert tool unit.

Preferably, at least when the insert tool unit has been fixed by means of the clamping unit, the clamping element engages behind a clamping extension of the insert tool unit. "Designed" is to be understood to mean, in particular, specially programmed, configured and/or equipped. That an object is designed for a particular function, is to be understood to mean, in particular, that the object fulfils and/or executes this particular function in at least one application state and/or operating state.

Preferably, by means of a mechanical connection, the clamping element can be moved between at least the operating element of the operating unit and the clamping element, by means of the operating unit, into the clamping position and/or into the release position.

Preferably, the operating element is realized as an operating lever, in particular as a pivotably mounted operating lever. It is also conceivable, however, that an electrical signal can be generated by means of an operating element of the operating unit, by means of which electrical signal an actuator, which is designed to move the clamping element into the clamping position and/or into the release position, can be controlled. The operating unit may be realized as a mechanical, as an electrical and/or as an electronic operating unit, which is designed to move the clamping element into the clamping position and/or into the release position as a result of an operating command of an operator and/or of an operating force of an operator.

Preferably, the clamping unit comprises at least two movably, in particular pivotably, mounted clamping elements. It is also conceivable, however, for the clamping unit to comprise a number of clamping elements other than two. Preferably, the at least two clamping elements are of an at least substantially similar design. Preferably, the at least two clamping elements of the clamping unit are mounted so as to be movable relative to each other, in particular pivotable relative to each other. In particular, the at least two clamping elements can be moved, by means of the operating unit, into a clamping position of the clamping elements and/or into a release position of the clamping elements. Preferably, the at least two clamping elements can be moved jointly by means of the operating unit, in particular jointly into the clamping position and/or into the release position. It is also conceivable, however, that the at least two clamping elements can be moved independently of each other, by means of the operating unit, into the clamping position and/or into the release position. The at least two clamping elements are preferably each mounted so as to be movable, in particular pivotable, about the clamping axis.

Preferably, the quick-change clamping device comprises at least one securing unit, in particular a self-locking unit and/or a latching unit, which is designed to prevent a movement of the clamping element, starting from the clamping position, into the release position of the clamping element, in particular apart from movements of the clamping element resulting from tolerance and/or play, at least in the case of a force, dissociated from the operating and acting in the direction of the release position of the clamping element, from acting upon the clamping element. Preferably, the securing unit, in particular the self-locking unit and/or the latching unit, is designed to secure the clamping element as far as possible against a movement into the release position of the clamping element, starting from the clamping position, at least in the case of a force, dissociated from the operating and acting in the direction of the release position of the clamping element. The expression "to secure as far as possible against a movement" is to be understood to mean, in particular, securing of an element, in particular in a position of the element, against a movement, wherein a movement of the element resulting from tolerance and/or play can be effected when the element is in a secured position. Preferably, in the clamping position, the clamping element can be secured by the securing unit, by means of a positive and/or non-positive connection, against a movement into the release position of the clamping element. Preferably, the securing unit is designed at least to prevent a pivot movement of the clamping element, starting from the clamping position of the clamping element, at least as far as possible, in particular apart from a pivot movement resulting from tolerance and/or play, against a pivot movement of the clamping element into the release position. The securing unit may be realized as a magnetic securing unit, as a mechanical securing unit, as an electronic securing unit, or the like. If the securing unit is designed as a magnetic securing unit, it is conceivable for the securing unit to comprise at least one magnet element, which secures the clamping element in the clamping position by means of action of a magnetic force. If the securing unit is designed as a mechanical securing unit, it is conceivable for the securing unit to comprise at least one mechanical securing element, which secures the clamping element in the clamping position by means of a positive and/or non-positive connection. If the securing unit is designed as an electronic securing unit, it is conceivable for the securing unit to comprise at least one electronic unit, which secures the clamping element in the clamping position and/or monitors the one position of the clamping element and, upon attainment of the clamping position, controls an actuator that secures the clamping element in the clamping position. Further designs of the securing unit, considered appropriate by persons skilled in the art, are likewise conceivable.

Preferably, the fastening unit is designed to arrange, in particular to fix, the torque transmission element to the output shaft in a rotationally fixed manner. The fastening unit may be realized as a non-positive, positive and/or materially bonded connection. For example, the fastening unit may be realized as bolt unit, as a rivet unit, as a screw-connection unit, as a positive-engagement unit, as a welded-joint unit, as an interference-fit connection unit, as a latching-hook connection unit and/or as another unit, considered appropriate by persons skilled in the art, that is designed to fix the torque transmission element to the output shaft, in particular in a rotationally fixed manner. Preferably, at least one fastening element of the fastening unit is realized integrally with the output shaft. It is also conceivable, however, for the fastening unit to have a multiplicity of fastening elements, which are realized integrally with the output shaft. "Integrally" is to be understood to mean, in particular, at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. For example, the fastening element of the fastening unit may be realized as a threaded element, as a bayonet closure element, as a receiving cutout, as an interference-fit element, as an output-shaft torque extension, or as another fastening element considered appropriate by persons skilled in the art.

Advantageously, by means of the design according to the disclosure, a compact design of the quick change clamping device can be achieved. Advantageously, it is possible to achieve safe transmission of a torque to the insert tool unit when the insert tool unit has been arranged on the output shaft.

Furthermore, in particular in at least one design of the quick-change clamping device according to the disclosure, it is proposed that the fastening unit have at least one fastening element that is designed to fasten the torque transmission element to the output shaft by means of a positive and/or non-positive connection. The fastening element may be realized, for example, as a pin, as a bolt, as an extension, as a thread, or as another element considered appropriate by persons skilled in the art. For example, it is conceivable for the fastening element to be realized integrally with the torque transmission element or with a cover element of a cover unit of the quick-change clamping device, the fastening element being realized as an axial extension, as a cutout, as a circumferential edge region of the cover element, or the like. It is conceivable for the fastening element to have an outer geometry that corresponds, at least partly, in particular according to a key-and-keyhole principle, to an inner contour of the output shaft that delimits a receiving cutout of the output shaft. Alternatively or additionally, it is conceivable for the fastening element to be realized as an axial extension, which is arranged on the cover element and/or on the torque transmission element, and which engages in a receiving cutout arranged on the output shaft, in particular as viewed along a direction running at least substantially parallel to a rotation axis of the output shaft. Further, it is alternatively or additionally conceivable for the fastening element to be realized as an interference-fit element, such as, for example, as a cone or the like, that is arranged on the cover element and/or on the torque transmission element and that can be pressed into a corresponding receiving cutout of the output shaft. It is also conceivable, however, for the fastening element to be arranged on the output shaft and to engage in a receiving cutout of the cover element and/or of the torque transmission element, or the like. Further designs of the fastening element, considered appropriate by persons skilled in the art, are likewise conceivable. Advantageously, by means of the design according to the disclosure, a structurally simple design of the fastening unit can be realized. Advantageously, a compact design of the quick-change clamping device can be achieved. Advantageously, it is possible to achieve safe transmission of a torque to the insert tool unit when the insert tool unit has been arranged on the output shaft.

It is further proposed, in particular in at least one design of the quick-change clamping device according to the disclosure, that the fastening element be designed to fasten, in addition to the torque transmission element, at least the clamping element to the output shaft, in particular to connect it to the output shaft in a rotationally fixed manner. Preferably, the clamping element, as a result of being fastened by means of the fastening element, is mounted so as to be rotatable, together with the torque transmission element and the output shaft, about the rotation axis of the output shaft. Preferably, the clamping element is fastened directly to the output shaft by means of the fastening element. In an alternative design, the clamping element is fastened, by means of the fastening element, to the torque transmission element, which is fastened to the output shaft, in particular is connected in a rotationally fixed manner to the output shaft, by means of at least one further fastening element of the fastening unit. Preferably, the fastening element is designed to fasten, in addition to the torque transmission element, at least two, in particular pivotably mounted clamping elements of the clamping unit to the output shaft, in particular to connect them to the output shaft in a rotationally fixed manner. It is also conceivable, however, for the fastening element to be designed to fasten to the output shaft a number of, in particular pivotably mounted, clamping elements of the clamping unit other than two. Advantageously, by means of the design according to the disclosure, it is possible to save on additional component parts for fastening the clamping element. Advantageously, a structurally simple design of the fastening unit can be realized. Advantageously, a compact design of the quick-change clamping device can be achieved. Advantageously, it is possible to achieve safe transmission of a torque to the insert tool unit when the insert tool unit has been arranged on the output shaft.

It is additionally proposed, in particular in at least one design of the quick-change clamping device according to the disclosure, that the fastening element be realized as a bolt, which, in a fastening state, has a longitudinal axis running transversely, in particular at least substantially perpendicularly, in relation to movement axis of the output shaft. Preferably, the fastening element is realized as a bearing bolt, which is designed to mount at least the clamping element movably relative to the output shaft. Preferably, the longitudinal axis of the fastening element forms an axis of main extent of the fastening element that runs transversely, in particular at least substantially perpendicularly, in relation to the rotation axis of the output shaft, in particular when the fastening element has been arranged on the output shaft. Preferably, the fastening element defines the pivot axis of the clamping element. Preferably, at least two clamping elements of the clamping unit are pivotably mounted on the output shaft by means of the fastening element. Advantageously, by means of the design according to the disclosure, a compact design of the quick-change clamping device can be achieved. Advantageously, it is possible to achieve safe transmission of a torque to the insert tool unit when the insert tool unit has been arranged on the output shaft.

It is furthermore proposed, in particular in at least one design of the quick-change clamping device according to the disclosure, that the fastening unit have at least one positive-engagement contour, which, at least for the purpose of fastening the torque transmission element, is designed to act in combination with at least one positive-engagement mating contour arranged on the output shaft. Preferably, the positive-engagement contour is realized integrally with the torque transmission element and/or with the cover element, on which the torque transmission element is preferably arranged. Preferably, the positive-engagement contour forms an outer contour of the torque transmission element and/or of the cover element, on which the torque transmission element is arranged, which outer contour extends, in particular, along the circumferential direction of the output shaft. The positive-engagement contour is preferably polygonal, elliptical, oval or the like, in particular as viewed in a plane extending at least substantially perpendicularly in relation to the rotation axis of the output shaft. Alternatively or additionally, the positive-engagement contour extends along a direction running at least substantially parallel to the rotation axis of the output shaft, in particular into a positive-engagement mating contour that is realized as a receiving cutout and arranged on the output shaft. Preferably, a torque can be transmitted from the output shaft to the torque transmission element as a result of a combined action of the positive-engagement contour and the positive-engagement mating contour. It is conceivable for the fastening unit to have a multiplicity of positive-engagement contours, which are arranged in an evenly or unevenly distributed manner, along the circumferential direction of the output shaft, on the torque transmission element, a number of positive-engagement mating contours, arranged on the output shaft, preferably being dependent on, in particular being equivalent to, a number of positive-engagement contours. Advantageously, by means of the design according to the disclosure, it is possible to realize a large fastening surface that enables the torque transmission element to be safely fastened to the output shaft. Advantageously, it is possible to achieve safe transmission of a torque to the insert tool unit when the insert tool unit has been arranged on the output shaft.

It is further proposed, in particular in at least one design of the quick-change clamping device according to the disclosure, that the fastening unit comprise at least one securing element, which is designed to secure a connection of the torque transmission element by means of the fastening element. Preferably, the securing element is realized differently from the fastening element. The securing element is preferably an element realized separately from the fastening element. The securing element may be realized as a securing bolt, as a securing screw, as a securing ring, as a securing lacquer, as a securing extension, or the like. Advantageously, the design according to the disclosure enables a high degree of operator safety to be achieved. Advantageously, unintentional separation of the fastening element from the output shaft can be avoided. Advantageously, it is possible to achieve safe transmission of a torque to the insert tool unit when the insert tool unit has been arranged on the output shaft.

It is additionally proposed, in particular in at least one design of the quick-change clamping device according to the disclosure, that the fastening unit have at least more than two fastening elements, which are designed to fasten the torque transmission element to the output shaft by means of a positive and/or non-positive connection. Preferably, the fastening elements are arranged in an evenly distributed manner, along the circumferential direction of the output shaft, on the output shaft, and/or on the cover element on which the torque transmission element is arranged. It is also conceivable, however, for the fastening elements to be arranged in an unevenly distributed manner, along the circumferential direction of the output shaft, on the output shaft, and/or on the cover element on which the torque transmission element is arranged. Advantageously, the design according to the disclosure makes it possible to achieve secure fastening of the torque transmission element to the output shaft. Advantageously, it is possible for the individual loading on the individual fastening elements for the purpose of torque transmission to be kept low. Advantageously, a particularly robust connection can be realized between the torque transmission element and the output shaft. Advantageously, it is possible to achieve safe transmission of a torque to the insert tool unit when the insert tool unit has been arranged on the output shaft.

It is furthermore proposed, in particular in at least one design of the quick-change clamping device according to the disclosure, that the fastening element be realized as a rivet element. Preferably, for the purpose of fastening the torque transmission element to the output shaft, the fastening element realized as a rivet element extends through the torque transmission element, and/or through the cover element on which the torque transmission element is arranged, and through at least one sub-region of the output shaft. It is also conceivable for the fastening element realized as a rivet element to be realized, at least partly, integrally with the output shaft, and to extend through the torque transmission element, and/or through the cover element on which the torque transmission element is arranged, or for the fastening element realized as a rivet element to be realized, at least partly, integrally with the torque transmission element, and/or with the cover element on which the torque transmission element is arranged, and to extend at least through a sub-region of the output shaft. Advantageously, by means of the design according to the disclosure, an inexpensive design of the fastening unit can be realized. Advantageously, it is possible to achieve safe transmission of a torque to the insert tool unit when the insert tool unit has been arranged on the output shaft.

It is further proposed, in at least one design of the quick-change clamping device according to the disclosure, that the fastening unit fasten the torque transmission element to the output shaft in a materially bonded manner, in particular by means of a welded connection of the fastening unit. Advantageously, by means of the design according to the disclosure, a structurally simple design of the fastening unit can be realized. Advantageously, by means of the design according to the disclosure, an inexpensive design of the fastening unit can be realized. Advantageously, it is possible to achieve safe transmission of a torque to the insert tool unit when the insert tool unit has been arranged on the output shaft.

It is additionally proposed that the fastening unit be realized as a threaded unit, and have at least one threaded element, arranged on the torque transmission element, and at least one further threaded element, arranged on the output shaft. Preferably, the threaded element arranged on the torque transmission element is realized as an internal thread. Preferably, the further threaded element, arranged on the output shaft, is realized as an external thread. It is also conceivable, however, for the threaded element realized on the torque transmission element to be realized as an external thread, and for the further threaded element, arranged on the output shaft, to be realized as an internal thread. Advantageously, by means of the design according to the disclosure, a structurally simple design of the fastening unit can be realized. Advantageously, by means of the design according to the disclosure, an inexpensive design of the fastening unit can be realized. Advantageously, it is possible to achieve safe transmission of a torque to the insert tool unit when the insert tool unit has been arranged on the output shaft.

It is furthermore proposed that the quick-change clamping device have at least one cover unit for at least partly covering an opening of the output shaft, out of which the clamping unit projects, at least partly, out of the output shaft, wherein the torque transmission element is fastened to at least one cover element of the cover unit, in particular is realized integrally with the cover element. Advantageously, the design according to the disclosure makes it possible to realize a compact design of the quick-change clamping device according to the disclosure. Advantageously, the ingress of dirt into the output shaft can be prevented.

Additionally proposed is a portable power tool, in particular a power angle grinder, having at least one quick-change clamping device according to the disclosure. A "portable power tool" is to be understood here to mean, in particular, a power tool, for performing work on workpieces, that can be transported by an operator without the use of a transport machine. The portable power tool has, in particular, a mass of less than 40 kg, preferably less than 10 kg, and particularly preferably less than 5 kg. Particularly preferably, the portable power tool is realized as a power angle grinder. It is also conceivable, however, for the portable power tool to be of a different design, considered appropriate by persons skilled in the art, such as, for example, designed as a multifunction power tool having an output shaft that can be driven in an oscillating manner, as a chain saw, as a miter saw, as a cross-cutting saw, as a miter saw, as a garden appliance, or the like. Advantageously, by means of the design according to the disclosure, a compact design of the portable power tool can be achieved. Advantageously, it is possible to achieve safe transmission of a torque to the insert tool unit when the insert tool unit has been arranged on the output shaft.

The quick-change clamping device according to the disclosure and/or the portable power tool according to the disclosure are/is not intended in this case to be limited to the application and embodiment described above. In particular, the quick-change clamping device according to the disclosure and/or the portable power tool according to the disclosure may have individual elements, component parts and units that differ in number from a number stated herein, in order to fulfill an operating principle described herein.

BRIEF DESCRIPTION OF THE DRAWINGS

Further advantages are disclosed by the following description of the drawing. Exemplary embodiments of the disclosure is represented in the drawing. The disclosure contains numerous features in combination. Persons skilled in the art will also expediently consider the features individually and combine them to create appropriate further combinations. There are shown.

DETAILED DESCRIPTION

Figure 1:
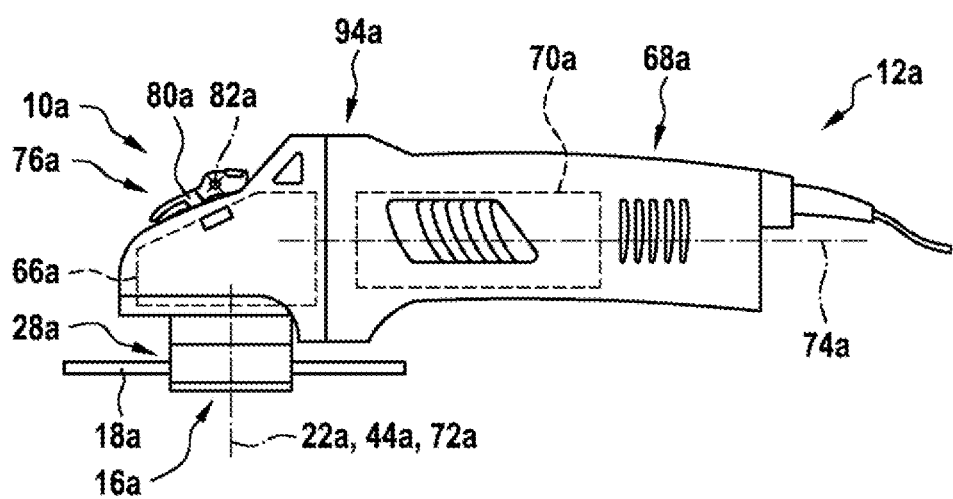
FIG. 1 a portable power tool according to the disclosure, in particular a power angle grinder, having at least one quick-change clamping device according to the disclosure, in a schematic representation, FIG. 2 a partial sectional view of the quick-change clamping device according to the disclosure, with a fastening unit of the quick-change clamping device according to the disclosure, in a schematic representation, FIG. 3a a detail view of a sealing unit of the quick-change clamping device according to the disclosure, in a schematic representation, FIG. 3b a detail view of an alternative sealing unit of the quick-change clamping device according to the disclosure, in a schematic representation, FIG. 3c a detail view of an alternative sealing unit of the quick-change clamping device according to the disclosure, in a schematic representation, FIG. 3d a detail view of an alternative sealing unit of the quick-change clamping device according to the disclosure, in a schematic representation, FIG. 3e a detail view of an alternative sealing unit of the quick-change clamping device according to the disclosure, in a schematic representation, FIG. 3f a detail view of an alternative sealing unit of the quick-change clamping device according to the disclosure, in a schematic representation, FIG. 3g a detail view of an alternative sealing unit of the quick-change clamping device according to the disclosure, in a schematic representation, FIG. 3h a detail view of an alternative sealing unit of the quick-change clamping device according to the disclosure, in a schematic representation, FIG. 4 a detail view of an alternative fastening unit of the quick-change clamping device according to the disclosure, in a schematic representation, FIG. 5 a detail view of an alternative fastening unit of the quick-change clamping device according to the disclosure, in a schematic representation, FIG. 6 a detail view of an alternative fastening unit of the quick-change clamping device according to the disclosure, in a schematic representation, FIG. 7 a detail view of an alternative fastening unit of the quick-change clamping device according to the disclosure, in a schematic representation, FIG. 8 a detail view of an alternative fastening unit of the quick-change clamping device according to the disclosure, in a schematic representation, FIG. 9 a detail view of an alternative fastening unit of the quick-change clamping device according to the disclosure, in a schematic representation, FIG. 10 a detail view of an alternative fastening unit of the quick-change clamping device according to the disclosure, in a schematic representation, FIG. 11 a detail view of an alternative fastening unit of the quick-change clamping device according to the disclosure, in a schematic representation, FIG. 12 a detail view of an alternative fastening unit of the quick-change clamping device according to the disclosure, in a schematic representation, FIG. 13 a detail view of an alternative fastening unit of the quick-change clamping device according to the disclosure, in a schematic representation, FIG. 14 a detail view of an alternative fastening unit of the quick-change clamping device according to the disclosure, in a schematic representation.

FIG. 1 shows a portable power tool 12a, realized as a power angle grinder, having a quick-change clamping device 10a. It is also conceivable, however, for the portable power tool 12a to be of a different design, considered appropriate by persons skilled in the art, such as, for example, designed as a circular saw machine, as a power sander, or the like. The portable power tool 12a comprises a transmission housing 94a for accommodating or mounting a transmission unit 66a of the portable power tool 12a. The transmission housing 94a is preferably made of a metallic material. It is also conceivable, however, for the transmission housing 94a to be made of a different material, considered appropriate by persons skilled in the art, such as, for example, of plastic, or the like. The transmission unit 66a is preferably realized as a bevel gear transmission. The transmission unit 66a comprises, in particular, an output shaft 14a, which can be driven in rotation and to which an insert tool unit 18a can be fixed, in particular by means of the quick-change clamping device 10a. The output shaft 14a is preferably realized as a hollow spindle, in which the quick-change clamping device 10a is arranged, at least partly (see FIG. 2). A protective hood unit, not represented in greater detail here, can be arranged on the transmission housing 94a, in a manner already known to persons skilled in the art. An auxiliary handle, not represented in greater detail here, can be arranged on the transmission housing 94a, in a manner already known to persons skilled in the art. The portable power tool 12a comprises a motor housing 68a, for accommodating and/or mounting a drive unit 70a of the portable power tool 12a. The drive unit 70a is preferably designed, in a manner already known to persons skilled in the art, to drive the output shaft 14a in rotation about a rotation axis 72a of the output shaft 14a, by means of a combined action with the transmission unit 66a. The rotation axis 72a of the output shaft 14a runs at least substantially perpendicularly in relation to a drive axis 74a of the drive unit 70a. The drive unit 70a is preferably realized as an electric-motor unit. It is also conceivable, however, for the drive unit 70a to be of a different design, considered appropriate by persons skilled in the art, such as, for example, designed as an internal-combustion drive unit, as a hybrid drive unit, as a pneumatic drive unit, or the like.

Figure 2:
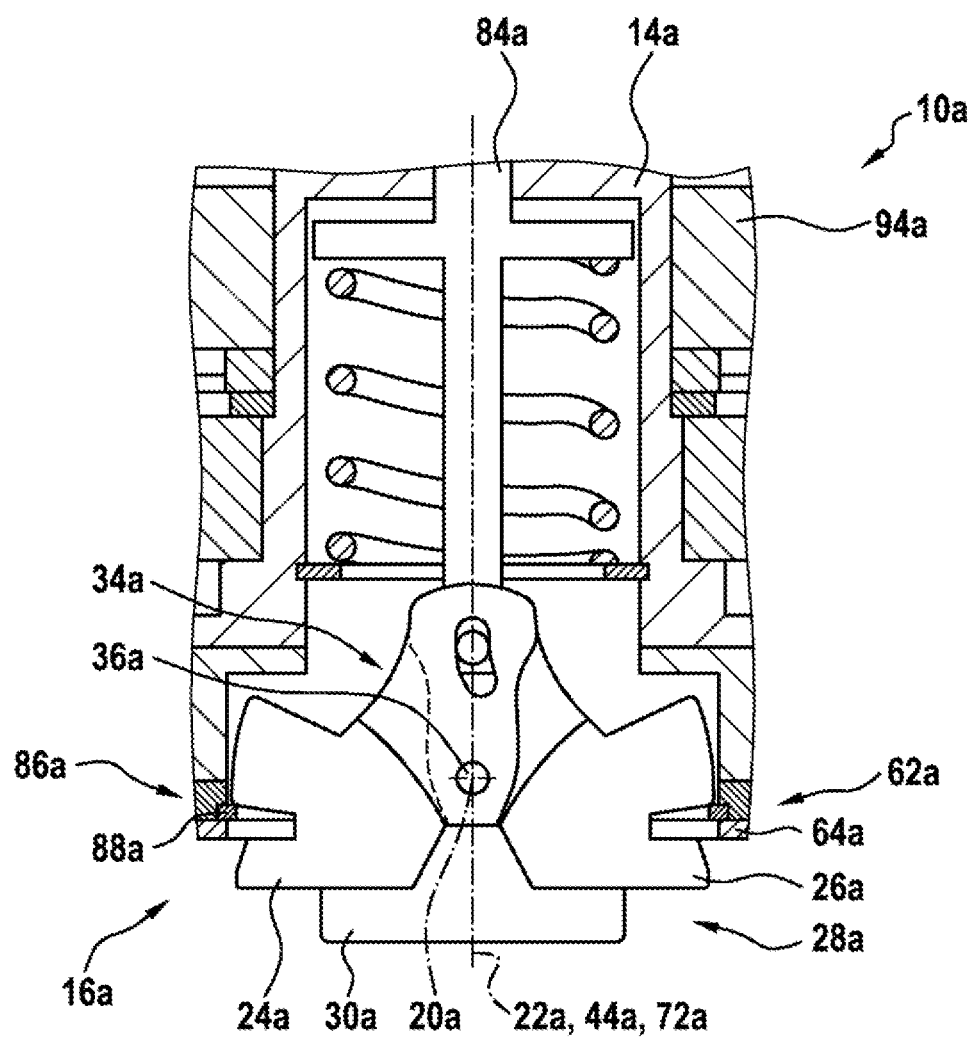

FIG. 2 shows a partial sectional view of the quick-change clamping device 10a, with a fastening unit 34a of the quick-change clamping device 10a. The quick-change clamping device 10a for the portable power tool 12a comprises at least the output shaft 14a, which in particular can be driven in rotation, at least one clamping unit 16a, which is arranged, at least partly, in the output shaft 14a and which, for the purpose of fixing the insert tool unit 18a to the output shaft 14a without the use of tools, has at least one clamping element 24a, 26a that is mounted so as to be movable at least about and/or along a movement axis 20a, 22a of the clamping unit 16a, and at least one torque transmission unit 28a, for transmitting a torque to the insert tool unit 18a when the insert tool unit 18a has been arranged on the output shaft 14a, which torque transmission unit has at least one torque transmission element 30a, 32a, in particular realized separately from the output shaft 14a. The quick-change clamping device 10a further comprises at least one operating unit 76a, for moving the clamping element 24a, 26a into a clamping position, and/or into a release position of the clamping element 24a, 26a in which the insert tool unit 18a can be removed from the clamping unit 16a and/or from the output shaft 14a (see FIG. 1). The clamping unit 16a comprises at least two movably mounted clamping elements 24a, 26a. It is also conceivable, however, for the clamping unit 16a to comprise a number of clamping elements 24a, 26a other than two. The at least two clamping elements 24a, 26a are of a substantially similar design, such that features disclosed in connection with one of the clamping elements 24a, 26a are to be considered as also having been disclosed for the further clamping element 24a, 26a. The at least two clamping elements 24a, 26a are pivotably mounted. The movement axis 20a of the clamping unit 16a preferably forms a pivot axis of the at least two clamping elements 24a, 26a. The pivot axis runs at least substantially perpendicularly in relation to the rotation axis 72a of the output shaft 14a. The at least two clamping elements 24a, 26a are designed to fix the insert tool unit 18a, when having been arranged on the clamping unit 16a and/or on the output shaft 14a, axially on the output shaft 14a, in particular in the clamping position of the at least two clamping elements 24a, 26a (see FIG. 2). The at least two clamping element 24a, 26a are connected to the output shaft 14a in a rotationally fixed manner. The at least two clamping elements 24a, 26a can be driven in rotation, together with the output shaft 14a, about the rotation axis 72a of the output shaft 14a. The rotation axis 72a of the output shaft 14a preferably runs at least substantially parallel to, in particular coaxially with, at least one further movement axis 22a of the clamping unit 16a, along which at least one actuating element 84a of the operating unit 76a is movably mounted, for the purpose of acting upon the clamping element 24a, 26a, in particular the at least two clamping elements 24a, 26a.

The operating unit 76a is preferably designed to move the clamping element 24a, 26a, in particular the at least two clamping elements 24a, 26a, at least into the release position, in which the insert tool unit 18a can be removed from the clamping unit 16a and/or from the output shaft 14a. Alternatively or additionally, it is conceivable for the operating unit 76a to be designed to move the clamping element 24a, 26a, in particular the at least two clamping elements 24a, 26a, at least into the clamping position, in which the insert tool unit 18a can be fixed to the output shaft 14a by means of the clamping unit 16a. The operating unit 76a preferably comprises at least one operating element 80a, which can be actuated by an operator. The operating element 80a is realized as an operating lever. The operating element 80a comprises a movement axis 82a, in particular a pivot axis, which runs transversely, in particular at least substantially perpendicularly, in relation to the rotation axis 72a of the output shaft 14a. The operating element 8a is preferably mounted so as to be pivotable about the movement axis 82a, in particular the pivot axis. The operating element 80a can preferably be decoupled from a rotary motion of the output shaft 14a.

The torque transmission unit 28a comprises at least one torque transmission element 30a for the purpose of transmitting torque to the insert tool unit 18a. The torque transmission unit 28a comprises at least two torque transmission elements 30a (only one of the two torque transmission elements 30a is represented in FIG. 2, wherein the torque transmission elements 30a of the design of the torque transmission unit 28a represented in FIG. 2 may be arranged on the output shaft 14a in a manner comparable to the design of the torque transmission unit 28c represented in, for example, FIG. 5). It is also conceivable, however, for the torque transmission unit 28a to comprise a number of torque transmission elements 30a other than two. The at least two torque transmission elements 30a are at least substantially similar in design, such that features disclosed in connection with one of the torque transmission elements 30a are to be considered as also having been disclosed for the further torque transmission element 30a. When the insert tool unit 18a has been arranged on the clamping unit 16a and/or on the output shaft 14a, the torque transmission element 30a engages in a receiving cutout of the insert tool unit 18a and, for the purpose of transmitting torque, bears against at least one edge of the insert tool unit 18a that delimits the receiving cutout. Transmission of torque between the output shaft 14a and the insert tool unit 18a arranged on the clamping unit 16a and/or on the output shaft 14a is preferably effected, in a manner already known to persons skilled in the art, by means of a positive and/or non-positive connection between the torque transmission element 30a and the insert tool unit 18. The torque transmission element 30a is arranged in a rotationally fixed manner on the output shaft 14a. The torque transmission element 30a can be driven in rotation, together with the output shaft 14a, about the rotation axis 72a of the output shaft 14a. Preferably, the quick-change clamping device 10a comprises at least one fastening unit 34a, at least for fastening the torque transmission element 30a to the output shaft 14a, in particular in a rotationally fixed manner. The fastening unit 34a has at least one fastening element 36a, which is designed to fasten the torque transmission element 30a, in particular the at least two torque transmission elements 30a, to the output shaft 14a by means of a positive and/or non-positive connection.

The quick-change clamping device 10a preferably comprises at least one cover unit 62a for at least partly covering an opening of the output shaft 14a, out of which the clamping unit 16a projects, at least partly, out of the output shaft 14a, wherein the torque transmission element 30a, in particular the at least two torque transmission elements 30a, is/are fastened to at least one cover element 64a of the cover unit 62a. The torque transmission element 30a, in particular the at least two torque transmission elements 30a, is/are preferably realized integrally with the cover element 64a. The fastening element 36a is designed to fasten, in addition to the torque transmission element 30a, at least the clamping element 24a, 26a, in particular the at least two clamping elements 24a, 26a, to the output shaft 14a. The fastening element 36a is realized as a bolt, which, in a fastening state, has a longitudinal axis 46a running transversely, in particular at least substantially perpendicularly, in relation to a movement axis 44a, in particular the rotation axis 72a, of the output shaft 14a. The longitudinal axis 46a of the fastening element 36a preferably defines the movement axis 20a, realized as a pivot axis, of the clamping unit 16a. The fastening element 36a preferably forms at least one bearing element for movably mounting the clamping element 24a, 26a, in particular the at least two clamping elements 24a, 26a, relative to the output shaft 14a, about the movement axis 20a, realized as a pivot axis, of the clamping unit 16a. For the purpose of fastening the torque transmission element 30a, in particular the at least two torque transmission elements 30a, and/or the clamping element 24a, 26a, in particular the at least two clamping elements 24a, 26a, the fastening element 36a engages at least in a fastening cutout of the fastening unit 34a that is arranged in the output shaft 14a. Preferably, for the purpose of fastening the torque transmission element 30a, in particular the at least two torque transmission elements 30a, and/or the clamping element 24a, 26a, in particular the at least two clamping elements 24a, 26a, the fastening element 36a reaches at least through the fastening cutout of the fastening unit 34a that is arranged in the output shaft 14a.

Figure 3A:
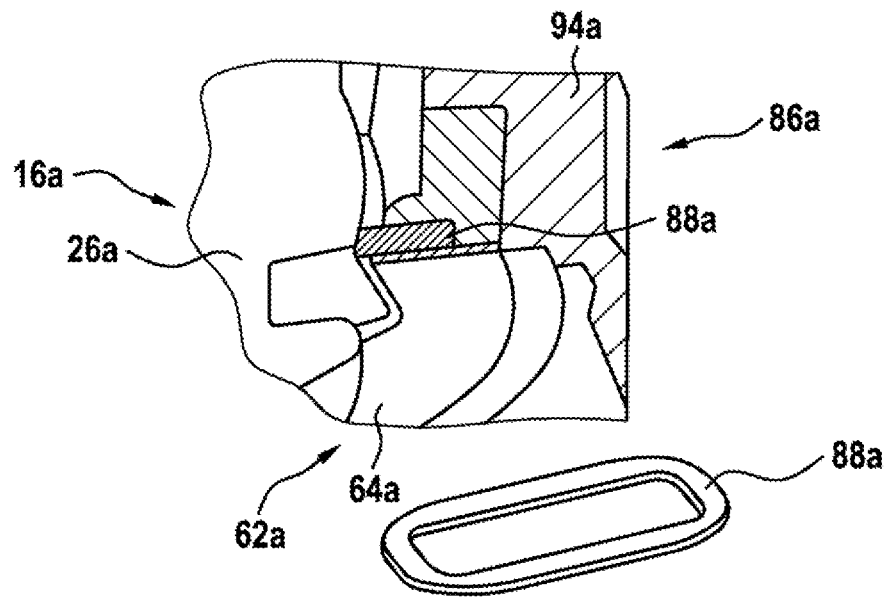

The quick-change clamping device 10a preferably comprises at least one sealing unit 86a, which is designed to seal, in particular at least against ingress of dirt, a gap between an edge region of the output shaft 14a that at least partly delimits the opening of the output shaft 14a, out of which the clamping unit 16a projects, at least partly, out of the output shaft 14a, and the clamping unit 16a, in particular the at least two clamping elements 24a, 26a (see FIGS. 2 and 3a. The sealing unit 86a preferably comprises at least one sealing element 88a, such as, for example, a rubber seal, or the like, in order, in particular, to prevent, at least as far as possible, ingress of dirt into the clamping unit 16a, in particular into the opening of the output shaft 14a, out of which the clamping unit 16a projects, at least partly, out of the output shaft 14a. The sealing element 88a preferably bears against an outer side of the clamping element 24a, 26a, in particular of the at least two clamping elements 24a, 26a. The clamping element 24a, 26a, in particular the at least two clamping elements 24a, 26a, is/are mounted so as to be movable relative to the sealing element 88a. In the case of a movement relative to the sealing element 88a, the clamping element 24a, 26a, in particular the at least two clamping elements 24a, 26a, slides/slide on at least one sealing surface of the sealing element 88a.

Figure 3B:
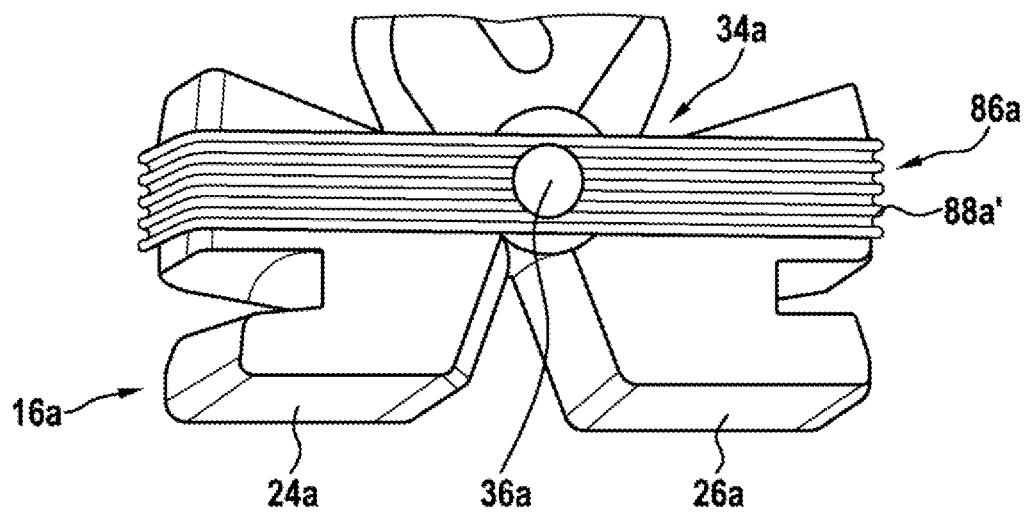

FIG. 3b shows an alternative design of a sealing element 88a' of the sealing unit 86a. The sealing element 88a' is realized as a caoutchouc seal, which bears against an outer surface of the clamping element 24a, 26a, in particular of the at least two clamping elements 24a, 26a. The sealing element 88a' has a receiving cutout, through which the fastening element 36a extends when in a mounted state. Preferably, when the fastening element 36a is in a mounted state, the sealing element 88a' bears against an outer side of the fastening element 36a. The sealing element 88a' preferably has a multiplicity of sealing ribs.

Figure 3C:
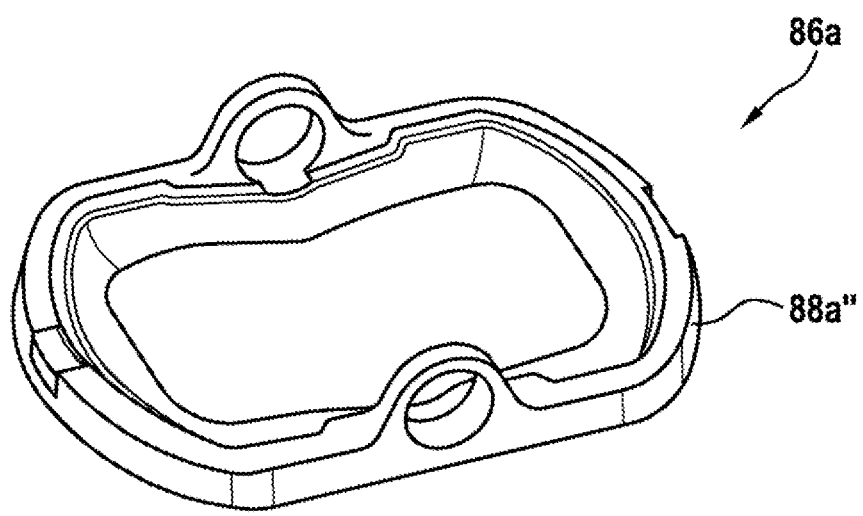

FIG. 3c shows a further, alternative, design of a sealing element 88a" of the sealing unit 86a. The sealing element 88a" is preferably realized as a plastic seal. The sealing element 88a" is preferably injection-molded onto a carrier element of the sealing unit 86a.

Figure 3D:
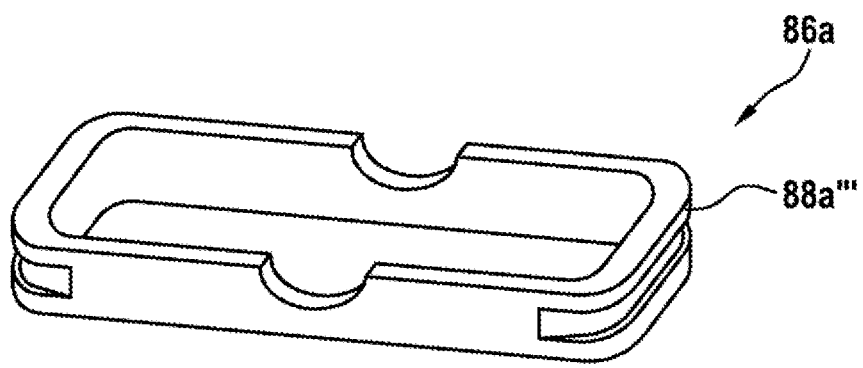

FIG. 3d shows a further, alternative, design of a sealing element 88a''' of the sealing unit 86a. The sealing element 88a''' is preferably realized as a rubber seal. The sealing element 88a''' preferably has a u-shaped or semicircular receiving cutout for arrangement on the fastening element 36a.

Figure 3E:
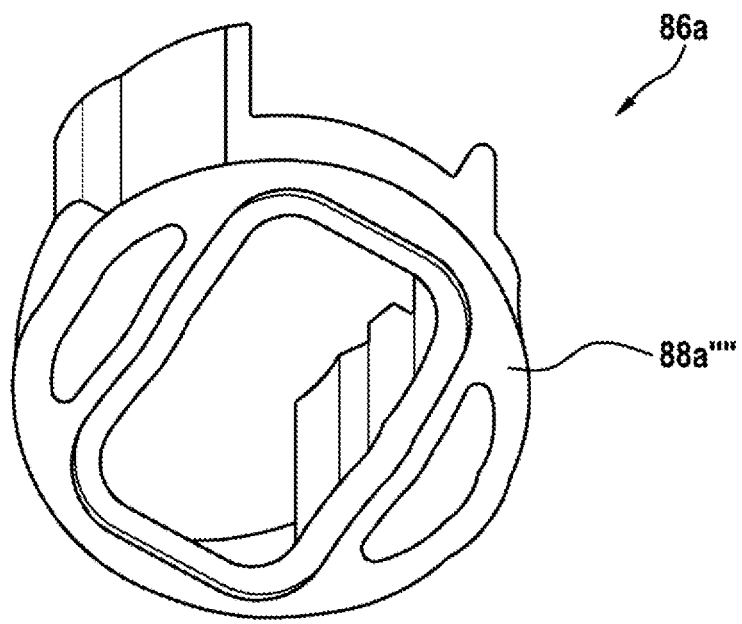

FIG. 3e shows a further, alternative, design of a sealing element 88a'''' of the sealing unit 86a. The sealing element 88a'''' is preferably realized as a two-component seal. The sealing element 88a'''' preferably has at least one soft plastic component, to perform a sealing function, and at least one hard plastic component, to perform a supporting and/or carrying function.

Figure 3F:
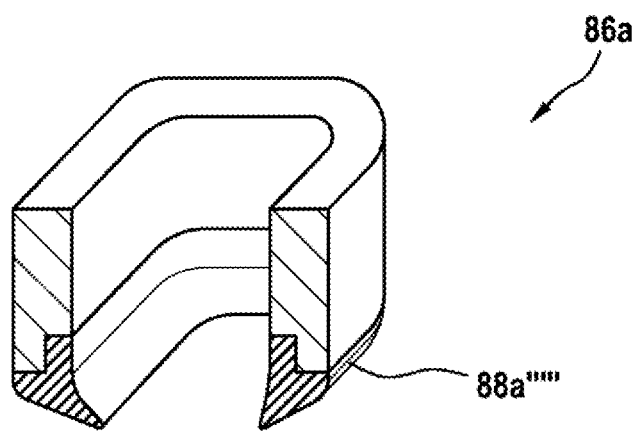

FIG. 3f shows a further, alternative, design of a 88a''''' of the sealing unit 86a. The 88a''''' is preferably realized as a two-component seal. The 88a''''' is preferably designed in the form of a hollow body, a sealing component being arranged on at least one side, and a supporting and/or carrying component on one side.

Figure 3G:
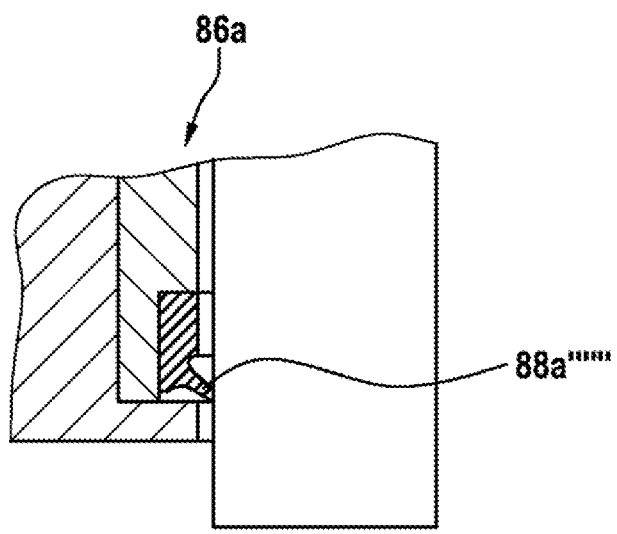

FIG. 3g shows a further, alternative, design of a sealing element 88a'''''' of the sealing unit 86a. The sealing element 88a'''''' is preferably realized as a two-component seal. The sealing element 88a'''''' is preferably designed in the form of a hollow body, a sealing component being integrated, at least partly, into a circumferential surface of a supporting and/or carrying component of the sealing element 88a''''''.

Figure 3H:
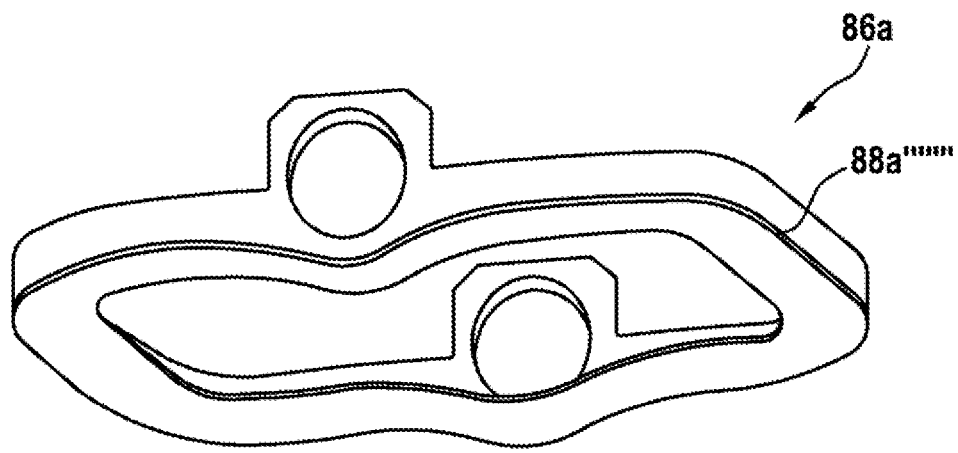

FIG. 3h shows a further, alternative, design of a sealing element 88a''''''' of the sealing unit 86a. The sealing element 88a''''''' is preferably realized as a rubber seal. The sealing element 88a''''''' is preferably injection-molded onto a supporting and/or carrying element of the sealing unit 86a that is made of a metallic material.

Further exemplary embodiments of the disclosure are shown in FIGS. 4 to 14. The descriptions and the drawing that follow are limited substantially to the differences between the embodiments, and in principle reference may also be made to the drawing and/or the description of the other exemplary embodiments, in particular of FIGS. 1 to 3h, in respect of components that have the same designation, in particular in respect of components denoted by the same references. To distinguish the exemplary embodiments, the letter a has been appended to the references of the exemplary embodiment in FIGS. 1 to 3h. In the exemplary embodiments of FIGS. 4 and 14, the letter a has been replaced by the letters b to l.

Figure 4:
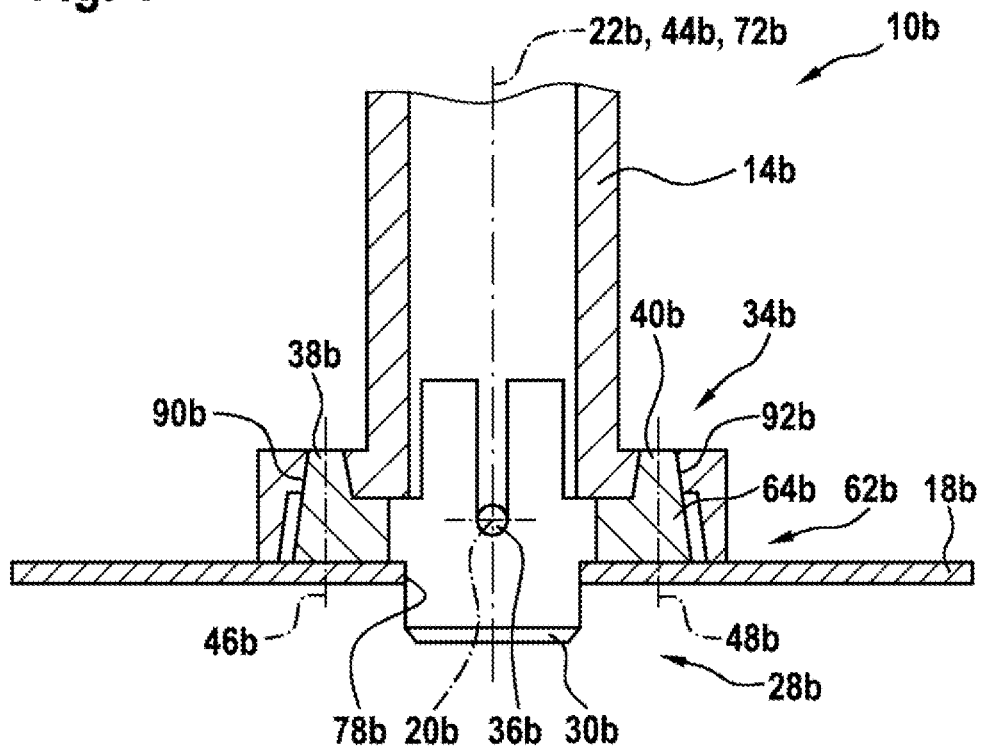

FIG. 4 shows a detail view of a fastening unit 34b of a quick-change clamping device 10b. Unlike the quick-change clamping device 10a represented in FIGS. 1 and 2, the fastening unit 34b of the quick-change clamping device 10b has at least two fastening elements 38b, 40b, which are designed to fasten at least one torque transmission element 30b of a torque transmission unit 28b of the quick-change clamping device 10b to an output shaft 14b of the quick-change clamping device 10b by means of a positive and/or non-positive connection. When an insert tool unit 18b has been arranged on a clamping unit 16b of the quick-change clamping device 10b and/or on the output shaft 14b, the torque transmission element 30b engages in a receiving cutout 78b of the insert tool unit 18b and, for the purpose of transmitting torque, bears against at least one edge of the insert tool unit 18b that delimits the receiving cutout 78b. The fastening elements 38b, 40b are preferably realized as interference-fit elements. The fastening elements 38b, 40b are realized as extensions, in particular as conical extensions. Preferably, the fastening elements 38b, 40b each have a longitudinal axis 46b, 48b that, when the fastening elements 38b, 40b have been arranged on the output shaft 14b, runs at least substantially parallel to the rotation axis 72b of the output shaft 14b. The fastening elements 38b, 40b are preferably each arranged with an interference fit in a corresponding interference-fit cutout 90b, 92b of the output shaft 14b. Preferably, the torque transmission element 30b, in particular the torque transmission elements 30b, are fixed exclusively by means of a non-positive connection of the fastening elements 38b, 40b and the interference-fit cutouts 90b, 92b of the output shaft 14b. It is also conceivable, however, for the fastening unit 34b additionally to have a securing element (not represented in greater detail here), for securing the connection between the fastening elements 38b, 40b and the output shaft 14b. The interference-fit cutouts 90b, 92b of the output shaft 14b are preferably conical. The fastening elements 38b, 40b are preferably realized integrally with a cover element 64b of a cover unit 62b of the quick-change clamping device 10b. Further, the fastening unit 34b has at least one fastening element 36b, for fastening at least one clamping element clamping unit (not represented in greater detail here) of the quick-change clamping device 10b. The fastening element 36b for fastening the clamping element is preferably realized as a bolt. With regard to further features and functions of the quick-change clamping device 10b, reference may be made to the description of the quick-change clamping device 10a represented in FIGS. 1 to 3h.

Figure 5:
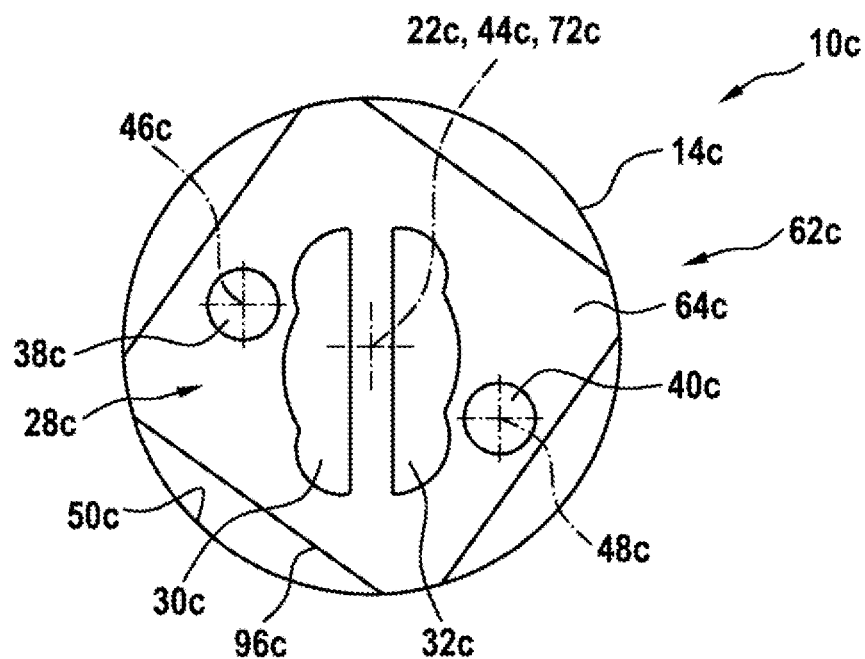

FIG. 5 shows a detail view of a fastening unit 34c of a quick-change clamping device 10c. Unlike the quick-change clamping device 10a represented in FIGS. 1 and 2, the fastening unit 34c of the quick-change clamping device 10c has at least two fastening elements 38c, 40c, which are designed to fasten at least one torque transmission element 30c, 32c, in particular at least two torque transmission elements 30c, 32c, of a torque transmission unit 28c of the quick-change clamping device 10c to the output shaft 14c by means of a positive and/or non-positive connection. The fastening elements 38c, 40c are preferably realized as threaded bolts, in particular as screws. The fastening unit 34c has at least one positive-engagement contour 96c, which, at least for the purpose of fastening the torque transmission element 30c, 32c, in particular the torque transmission elements 30c, 32c, is designed to act in combination with at least one positive-engagement mating contour 50c arranged on an output shaft 14c of the quick-change clamping device 10c. Preferably, a torque can be transmitted from the output shaft 14c to the torque transmission element 30c, 32c as a result of a combined action of the positive-engagement contour 96c and the positive-engagement mating contour 50c. The positive-engagement mating contour 50c is preferably formed as an inner surface of the output shaft 14c realized as a hollow spindle. Preferably, the positive-engagement contour 96c is realized integrally with the torque transmission element 30c, 32c, in particular with the torque transmission elements 30c, 32c, and/or with a cover element 64c of a cover unit 62c of the quick-change clamping device 10c on which the torque transmission element 30c, 32c, in particular the torque transmission elements 30c, 32c is/are preferably arranged. Preferably, the positive-engagement contour 96c forms an outer contour of the torque transmission element 30c, 32c and/or of the cover element 64c on which the torque transmission element 30c, 32c is arranged, which outer contour extends, in particular, along a circumferential direction of the output shaft 14c. The positive-engagement contour 96c is preferably polygonal, elliptical, oval or the like, in particular as viewed in a plane extending at least substantially perpendicularly in relation to a rotation axis 72c of the output shaft 14c. With regard to further features and functions of the quick-change clamping device 10c, reference may be made to the description of the quick-change clamping device 10a represented in FIGS. 1 to 3h.

Figure 6:
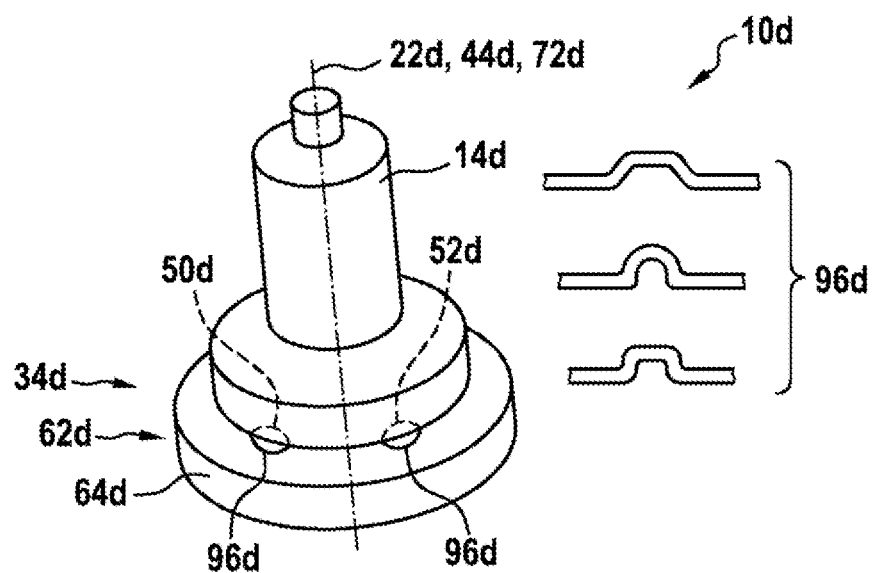

FIG. 6 shows a detail view of a fastening unit 34d of a quick-change clamping device 10d. Unlike the quick-change clamping device 10c represented in FIG. 5, the fastening unit 34d of the quick-change clamping device 10d has at least one positive-engagement contour 96d, which, at least for the purpose of fastening a torque transmission element (not represented in greater detail here), is designed to act in combination with at least one positive-engagement mating contour 50d arranged on an output shaft 14d of the quick-change clamping device 10d. Preferably, a torque can be transmitted from the output shaft 14d to the torque transmission element as a result of a combined action of the positive-engagement contour 96d and the positive-engagement mating contour 50d. The positive-engagement contour 96d preferably extends along a direction running at least substantially parallel to a rotation axis 72d of the output shaft 14d, in particular into positive-engagement mating contour 50d, 52d that is realized as a receiving cutout and arranged on the output shaft 14d. The positive-engagement contour 96d is preferably realized in the shape of a cup. The positive-engagement contour 96d, as viewed in a plane extending at least substantially parallel to the rotation axis 72d of the output shaft 14d, may be of a trapezoidal, u-shaped, rectangular, quadrilateral, or the like design (in connection therewith see also detail views in FIG. 6). Preferably, the fastening unit 34d comprises a multiplicity of positive-engagement contours 96d, which act in combination with a plurality of positive-engagement mating contours 50d arranged on the output shaft 14d of the quick-change clamping device 10d. With regard to further features and functions of the quick-change clamping device 10d, reference may be made to the description of the quick-change clamping device 10a represented in FIGS. 1 to 3h.

Figure 7:
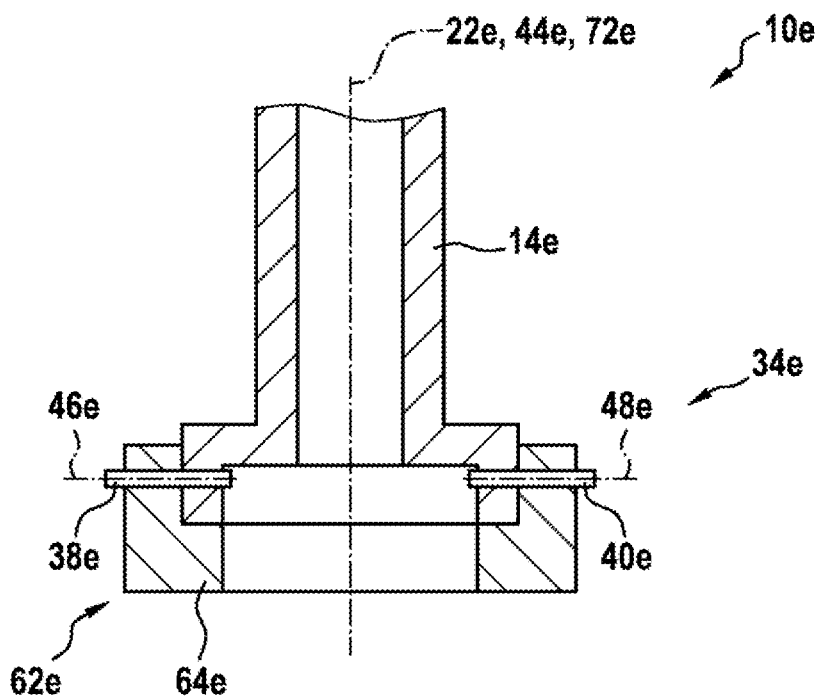

FIG. 7 shows a detail view of a fastening unit 34e of a quick-change clamping device 10e. Unlike the quick-change clamping device 10a represented in FIGS. 1 and 2, the fastening unit 34e of the quick-change clamping device 10e has at least two fastening elements 38e, 40e, which are realized as bolts, which, in a fastening state, has a longitudinal axis 46e, 48e running transversely, in particular at least substantially perpendicularly, in relation to movement axis of an output shaft 14e of the quick-change clamping device 10e. Preferably, the fastening elements 38e, 40e reach through at least one cover element 64e of a cover unit 62e on which the at least one torque transmission element (not represented in greater detail here) is arranged. Preferably, the fastening elements 38e, 40e grip, at least partly, an outer wall of the output shaft 14e. With regard to further features and functions of the quick-change clamping device 10e, reference may be made to the description of the quick-change clamping device 10a represented in FIGS. 1 to 3h.

Figure 8:
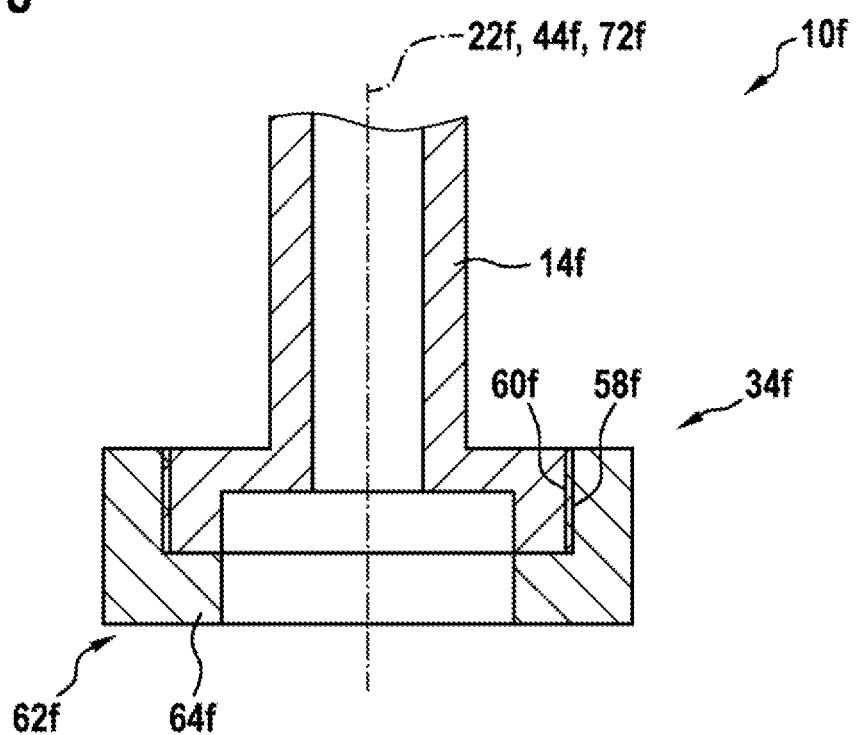

FIG. 8 shows a detail view of a fastening unit 34f of a quick-change clamping device 10f. Unlike the quick-change clamping device 10a represented in FIGS. 1 and 2, the fastening unit 34f of the quick-change clamping device 10f is realized as a threaded unit, and has at least one threaded element 58f arranged on the torque transmission element (not represented in greater detail here) and/or on a cover element 64f of a cover unit 62f, and at least one further threaded element 60f arranged on the output shaft 14f. Preferably, the threaded element 58f arranged on the torque transmission element and/or on the cover element 64f is realized as an internal thread. Preferably, the further threaded element 60f arranged on the output shaft 14f is realized as an external thread. It is also conceivable, however, for the threaded element 58f arranged on the torque transmission element and/or on the cover element 64f to be realized as an external thread, and for the further threaded element 60f arranged on the output shaft 14f to be realized as an internal thread. With regard to further features and functions of the quick-change clamping device 10f, reference may be made to the description of the quick-change clamping device 10a represented in FIGS. 1 to 3h.

Figure 9:
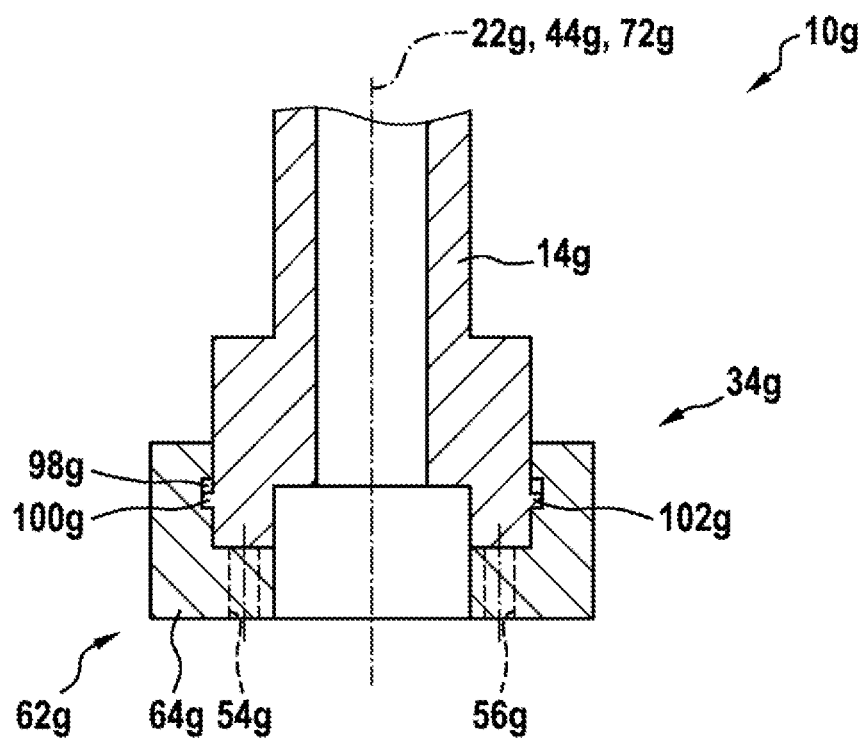

FIG. 9 shows a detail view of a fastening unit 34g of a quick-change clamping device 10g. Unlike the quick-change clamping device 10a represented in FIGS. 1 and 2, the fastening unit 34g of the quick-change clamping device 10g is realized as a quick-action closure unit, in particular as a bayonet closure unit. Preferably, a link 98g of the fastening unit 34g is arranged on a torque transmission element of a torque transmission unit (not represented in greater detail here) of the quick-change clamping device 10g, and/or on a cover element 64g of a cover unit 62g of the quick-change clamping device 10g on which the torque transmission element is arranged. At least one link engagement element 100g, 102g of the fastening unit 34g is preferably arranged on an output shaft 14g of the quick-change clamping device 10g. It is also conceivable, however, for the link 98g to be arranged on the output shaft 14g, and for the at least one link engagement element 100g, 102g to be arranged on the torque transmission element and/or on the cover element 64g. The fastening unit 34g comprises at least one securing element 54g, 56g, in particular at least two securing elements 54g, 56g, which is/are designed to secure a connection of the torque transmission element and/or of the cover element 64g of the cover unit 62g of the quick-change clamping device 10g. The securing element 54g, 56g, in particular the securing elements 54g, 56g, is/are preferably realized as threaded bolts, in particular as a screw/screws. The fastening unit 34g preferably comprises at least the element 54g, 56g, in particular the at least two securing elements 54g, 56g, which is/are designed to secure a connection of the torque transmission element by means of the fastening element realized as a link 98g or link engagement element 100g, 102g. With regard to further features and functions of the quick-change clamping device 10g, reference may be made to the description of the quick-change clamping device 10a represented in FIGS. 1 to 3h.

Figure 10:
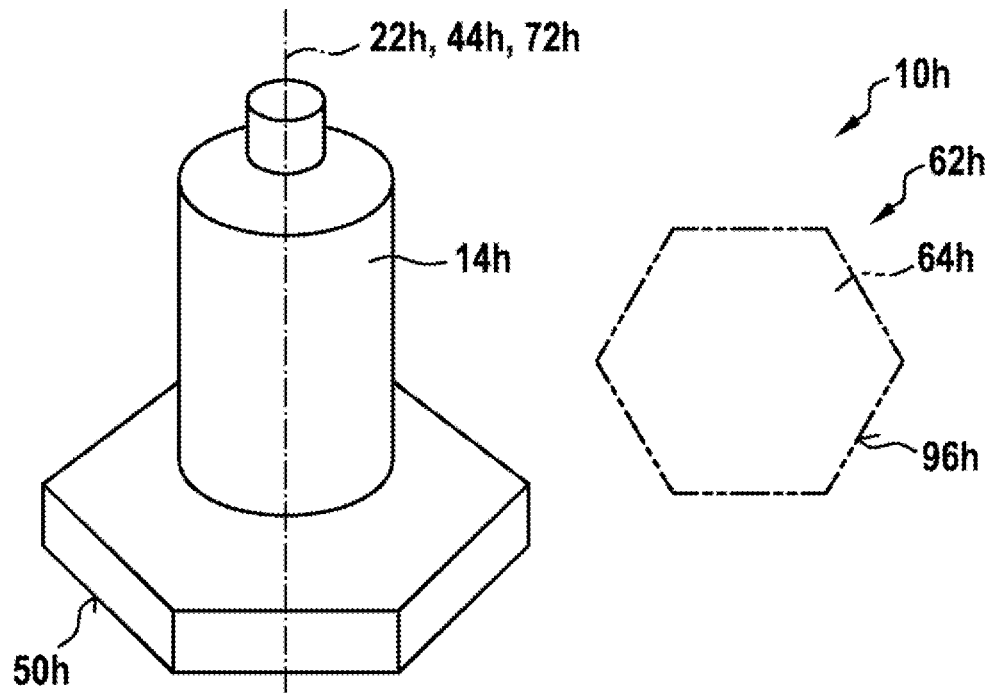

FIG. 10 shows a detail view of a fastening unit 34h of a quick-change clamping device 10h. Unlike the quick-change clamping device 10a represented in FIGS. 1 and 2, the fastening unit 34h of the quick-change clamping device 10h has at least one positive-engagement contour 96h, which, at least for the purpose of fastening a torque transmission element (not represented in greater detail here), is designed to act in combination with at least one positive-engagement mating contour 50h arranged on an output shaft 14h of the quick-change clamping device 10h. Preferably, a torque can be transmitted from the output shaft 14h to the torque transmission element as a result of a combined action of the positive-engagement contour 96h and the positive-engagement mating contour 50h. The positive-engagement contour 96h preferably extends in a plane extending at least substantially perpendicularly in relation to a rotation axis 72h of the output shaft 14h. Preferably, the positive-engagement contour 96h forms an outer circumference of a cover element 65h of a cover unit 62h of the quick-change clamping device 10h. The positive-engagement contour 50h is preferably formed by an inner surface of the output shaft 14h. Preferably, the fastening unit 34h additionally comprises at least one fastening element (not represented in greater detail here), which is preferably realized as a threaded bolt, in particular as a screw. With regard to further features and functions of the quick-change clamping device 10h, reference may be made to the description of the quick-change clamping device 10a represented in FIGS. 1 to 3h.

Figure 11:
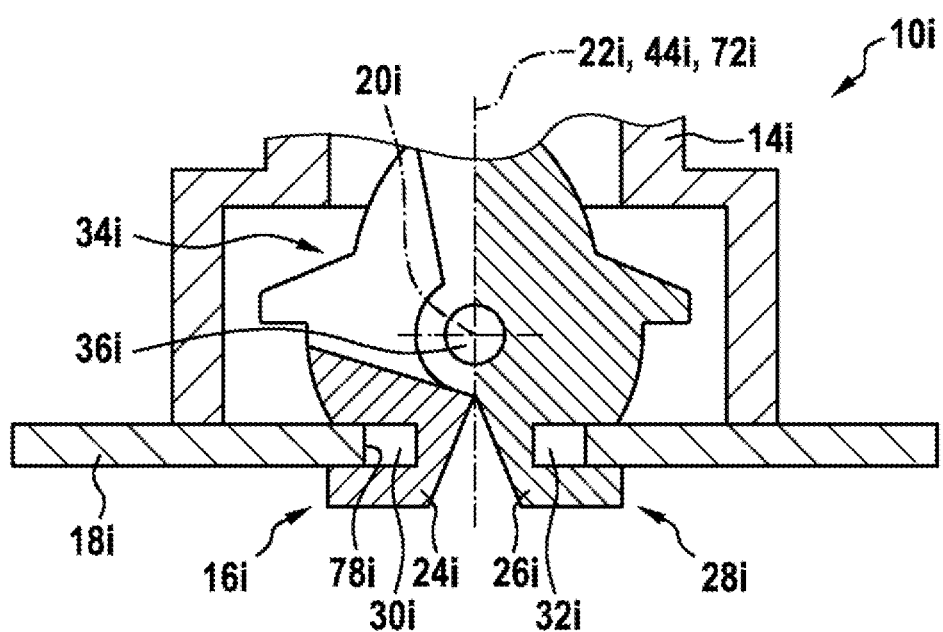

FIG. 11 shows a detail view of a fastening unit 34i of a quick-change clamping device 10i. Unlike the quick-change clamping device 10a represented in FIGS. 1 and 2, the quick-change clamping device 10i has a torque transmission unit 28i, which comprises at least two torque transmission elements 30i, 32i, which are realized integrally with clamping elements 24i, 26i of a clamping unit 16i of the quick-change clamping device 10i. The quick-change clamping device 10i comprises at least one fastening unit 34i, at least for fastening the torque transmission elements 30i, 32i to the output shaft 14i, in particular in a rotationally fixed manner. The fastening unit 34i has at least one fastening element 36i, realized as a bolt, in particular as a bearing element, which is designed to fasten the torque transmission elements 30i, 32i to the output shaft 14i by means of a positive and/or non-positive connection, in particular via the clamping elements 24i, 26i. With regard to further features and functions of the quick-change clamping device 10i, reference may be made to the description of the quick-change clamping device 10a represented in FIGS. 1 to 3h.

Figure 12:
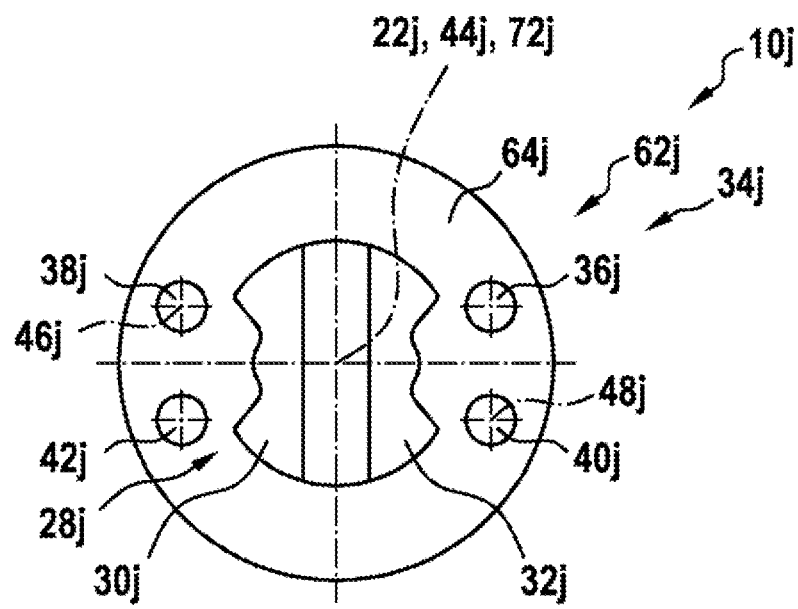

FIG. 12 shows a detail view of a fastening unit 34j of a quick-change clamping device 10j. Unlike the quick-change clamping device 10a represented in FIGS. 1 and 2, the fastening unit 34j has at least more than two, in particular at least four, fastening elements 36j, 38j, 40j, 42j, which are designed to fasten a torque transmission element 30j, 32j, in particular at least two torque transmission elements 30j, 32j, to the output shaft 14j by means of a positive and/or non-positive connection. The fastening elements 36j, 38j, 40j, 42j are preferably realized as threaded bolts, in particular as screws. With regard to further features and functions of the quick-change clamping device 10j, reference may be made to the description of the quick-change clamping device 10a represented in FIGS. 1 to 3h.

Figure 13:
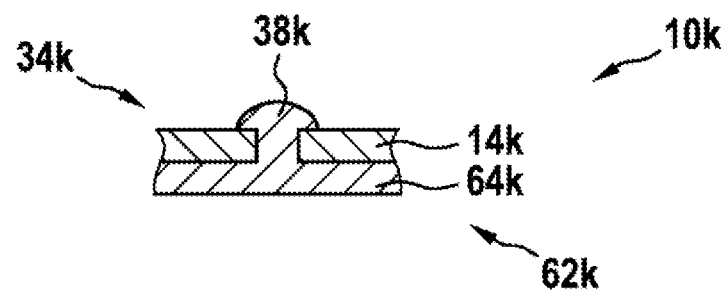

FIG. 13 shows a detail view of a fastening unit 34k of a quick-change clamping device 10k. Unlike the quick-change clamping device 10a represented in FIGS. 1 and 2, the fastening unit 34k has at least one fastening element 38k, which is realized as a rivet element. Preferably, for the purpose of fastening a torque transmission element of a torque transmission unit (not represented in greater detail here) of the quick-change clamping device 10h to an output shaft 14k of the quick-change clamping device 10k, the fastening element 38k realized as a rivet element extends through the torque transmission element, and/or through a cover element 64k of a cover unit 62k of the quick-change clamping device 10k, on which the torque transmission element is arranged, and through at least one sub-region of the output shaft 14k. It is also conceivable for the fastening element 38k realized as a rivet element to be realized, at least partly, integrally with the output shaft 14k, and to extend through the torque transmission element, and/or through the cover element 64k on which the torque transmission element is arranged, or for the fastening element 38k realized as a rivet element to be realized, at least partly, integrally with the torque transmission element, and/or with the cover element 64k on which the torque transmission element is arranged, and to extend at least through a sub-region of the output shaft 14k. With regard to further features and functions of the quick-change clamping device 10k, reference may be made to the description of the quick-change clamping device 10*a* represented in FIGS. 1 to 3*h*.

Figure 14:
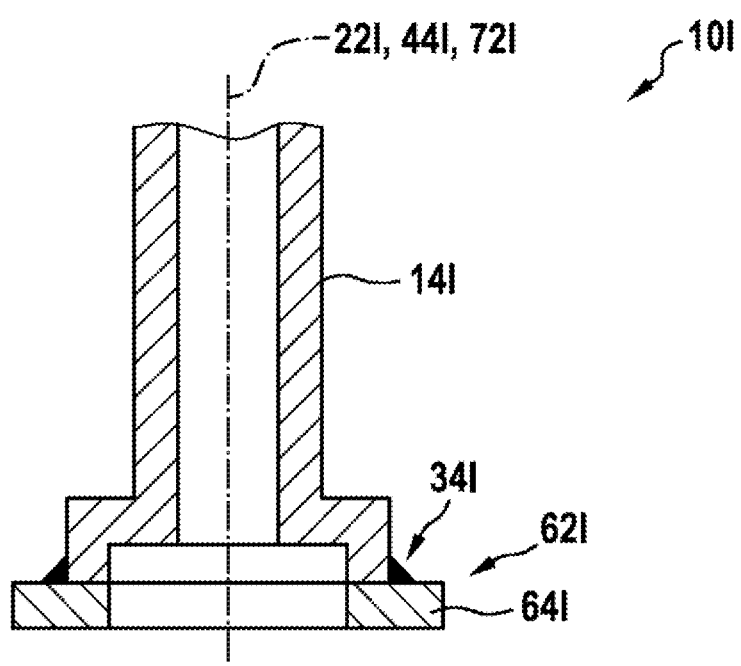

FIG. 14 shows a detail view of a fastening unit 34*l* of a quick-change clamping device 10*l*. Unlike the quick-change clamping device 10*a* represented in FIGS. 1 and 2, the fastening unit 34*l* is designed to fasten a torque transmission element (not represented in greater detail here) and/or a cover element 64*l* of a cover unit 62*l* of the quick-change clamping device 10*l*, on which the torque transmission element is arranged, to an output shaft 14*l* in a materially bonded manner, in particular by means of a welded connection of the fastening unit 34*l*. Preferably, the fastening unit 34*l* is realized as welded connection unit. With regard to further features and functions of the quick-change clamping device 10*l*, reference may be made to the description of the quick-change clamping device 10*a* represented in FIGS. 1 to 3*h*.

The invention claimed is:

1. A quick-change clamping device for a portable power tool, comprising:
   an output shaft configured to be driven in rotation;
   a clamping unit arranged, at least partially, in the output shaft, the clamping unit including at least one clamping element mounted so as to be movable about and along a movement axis of the clamping unit so as to fix an insert tool unit to the output shaft without the use of tools;
   a torque transmission unit, which has torque transmission element configured to transmit a torque to the insert tool unit when the insert tool unit has been arranged on the output shaft, the torque transmission unit comprising a fastening unit configured to fasten the at least one torque transmission element to the output shaft in a rotationally fixed manner; and
   a sealing element configured to at least partly cover an opening of the output shaft, out of which the clamping unit projects, at least partly, when the insert tool unit has been arranged on the output shaft,
   wherein a fastening element of the fastening unit extends through a receiving cutout defined entirely by the sealing element,
   wherein the at least one clamping element is configured to pivot about the fastening element, and
   wherein the at least one torque transmission element is configured to move axially along the movement axis relative to the output shaft.

2. The quick-change clamping device as claimed in claim 1, wherein the fastening element is further configured to fasten the torque transmission element to the output shaft.

3. The quick-change clamping device as claimed in claim 2, wherein the fastening element is further configured to fasten the at least clamping element to the output shaft.

4. The quick-change clamping device as claimed in claim 2, wherein the fastening element is a bolt, which, in a fastened state, has a longitudinal axis running transversely in relation to a movement axis of the output shaft.

5. The quick-change clamping device as claimed in claim 4, wherein, in the fastened state, the longitudinal axis of the bolt runs at least substantially perpendicularly in relation to the movement axis of the output shaft.

6. The quick-change clamping device as claimed in claim 2, wherein the fastening unit has at least one positive-engagement contour, which is configured to act in combination with at least one positive-engagement mating contour arranged on the output shaft to fasten the torque transmission element.

7. The quick-change clamping device as claimed in claim 2, wherein the fastening unit comprises at least one securing element, which is configured to secure a connection of the torque transmission element by means of the fastening element.

8. The quick-change clamping device as claimed in claim 2, wherein the fastening unit has more than two fastening elements, which are configured to fasten the torque transmission element to the output shaft by at least one of a positive connection and a non-positive connection.

9. The quick-change clamping device as claimed in claim 2, wherein the fastening element includes a rivet element.

10. The quick-change clamping device as claimed in claim 1, wherein the fastening unit fastens the torque transmission element to the output shaft in a materially bonded manner.

11. The quick-change clamping device as claimed in claim 10, wherein the fastening unit includes a welded connection that fastens the torque transmission element to the output shaft in the materially bonded manner.

12. The quick-change clamping device as claimed in claim 1, wherein the fastening unit includes a threaded unit having at least one threaded element arranged on the torque transmission element and at least one further threaded element arranged on the output shaft.

13. The quick-change clamping device as claimed in claim 1, further comprising:
   a cover unit configured to at least partly cover the opening of the output shaft, out of which the clamping unit projects, at least partly, out of the output shaft,
   wherein the torque transmission element is fastened to at least one cover element of the cover unit.

14. The quick-change clamping device as claimed in claim 13, wherein the torque transmission element is integral with the cover element.

15. The quick-change clamping device as claimed in claim 1, wherein the quick-change clamping device is configured for a power angle grinder.

16. The quick-change clamping device as claimed in claim 1, wherein the torque transmission element is realized separately from the output shaft.

17. A portable power tool comprising:
   at least one quick-change clamping device comprising:
      an output shaft configured to be driven in rotation;
      a clamping unit arranged, at least partially, in the output shaft, the clamping unit including at least one clamping element mounted so as to be movable about and along a movement axis of the clamping unit so as to fix an insert tool unit to the output shaft without the use of tools;
      a torque transmission unit which has torque transmission element configured to transmit a torque to the insert tool unit when the insert tool unit has been arranged on the output shaft, the torque transmission unit comprising a fastening unit configured to fasten the torque transmission element to the output shaft in a rotationally fixed manner; and
      a sealing element configured to at least partly cover an opening of the output shaft, out of which the clamping unit projects, at least partly, when the insert tool unit has been arranged on the output shaft,
   wherein a fastening element of the fastening unit extends through a receiving cutout defined entirely by the sealing element,
   wherein the at least one clamping element is configured to pivot about the fastening element, and wherein the at least one torque transmission element is configured to move axially along the movement axis relative to the output shaft.

18. The portable power tool as claimed in claim 17, wherein the portable power tool is a power angle grinder.

\* \* \* \* \*

UNITED STATES PATENT AND TRADEMARK OFFICE
CERTIFICATE OF CORRECTION

PATENT NO. : 10,828,742 B2
APPLICATION NO. : 16/324470
DATED : November 10, 2020
INVENTOR(S) : Luescher et al.

It is certified that error appears in the above-identified patent and that said Letters Patent is hereby corrected as shown below:

In the Claims

In Claim 1, at Column 19, Lines 29-30: "which has torque transmission element" should read --which has at least one torque transmission element--.

In Claim 3, at Column 19, Line 53: "the at least clamping element" should read --the at least one clamping element--.

In Claim 16, at Column 20, Line 41: "the torque transmission element" should read --the at least one torque transmission element--.

In Claim 17, at Column 20, Lines 52-53: "which has torque transmission element" should read --which has at least one torque transmission element--.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*